United States Patent [19]
Maxson et al.

[11] 4,189,092
[45] Feb. 19, 1980

[54] DAMPER CONTROL FOR PREVENTING SPREAD OF FIRE AND SMOKE THROUGH AN INDUCTION MIXING BOX

[75] Inventors: Dale E. Maxson, Rockford, Ill.; David E. Ober, Warren, N.J.

[73] Assignee: Barber-Colman Company, Rockford, Ill.

[21] Appl. No.: 1,498

[22] Filed: Jan. 8, 1979

[51] Int. Cl.² .............................................. G05D 23/13
[52] U.S. Cl. ........................................ 236/13; 236/49
[58] Field of Search ...................... 236/49, 13; 169/60

[56] References Cited

U.S. PATENT DOCUMENTS

| | | | |
|---|---|---|---|
| 3,720,258 | 3/1973 | Chandler | 236/49 X |
| 3,823,870 | 7/1974 | Chandler | 236/49 |
| 3,883,071 | 5/1975 | Meckler | 236/49 |
| 3,912,223 | 10/1975 | Iwata | 169/60 X |
| 4,073,433 | 2/1978 | Modes | 236/49 |
| 4,084,744 | 4/1978 | Wilson, Jr. | 236/49 |
| 4,086,781 | 5/1978 | Brody et al. | 236/49 X |
| 4,148,435 | 4/1979 | Meyers et al. | 236/49 X |

*Primary Examiner*—William E. Wayner
*Assistant Examiner*—William E. Tapolcai
*Attorney, Agent, or Firm*—Robert M. Hammes, Jr.; A. Richard Koch

[57] ABSTRACT

Upon sensing an excessive temperature in a plenum supplying secondary air to a mixing box, a thermostatic element opens a valve to exhaust air from a pneumatic actuator for opening a normally closed secondary air damper. This action permits the damper to close and so prevent flow of secondary air from the plenum into the mixing box. The control may be tested by applying auxiliary heat to the thermostatic element. The control may be made to prevent spread of smoke by making the application of heat to the thermostatic element responsive to a smoke detector.

9 Claims, 2 Drawing Figures

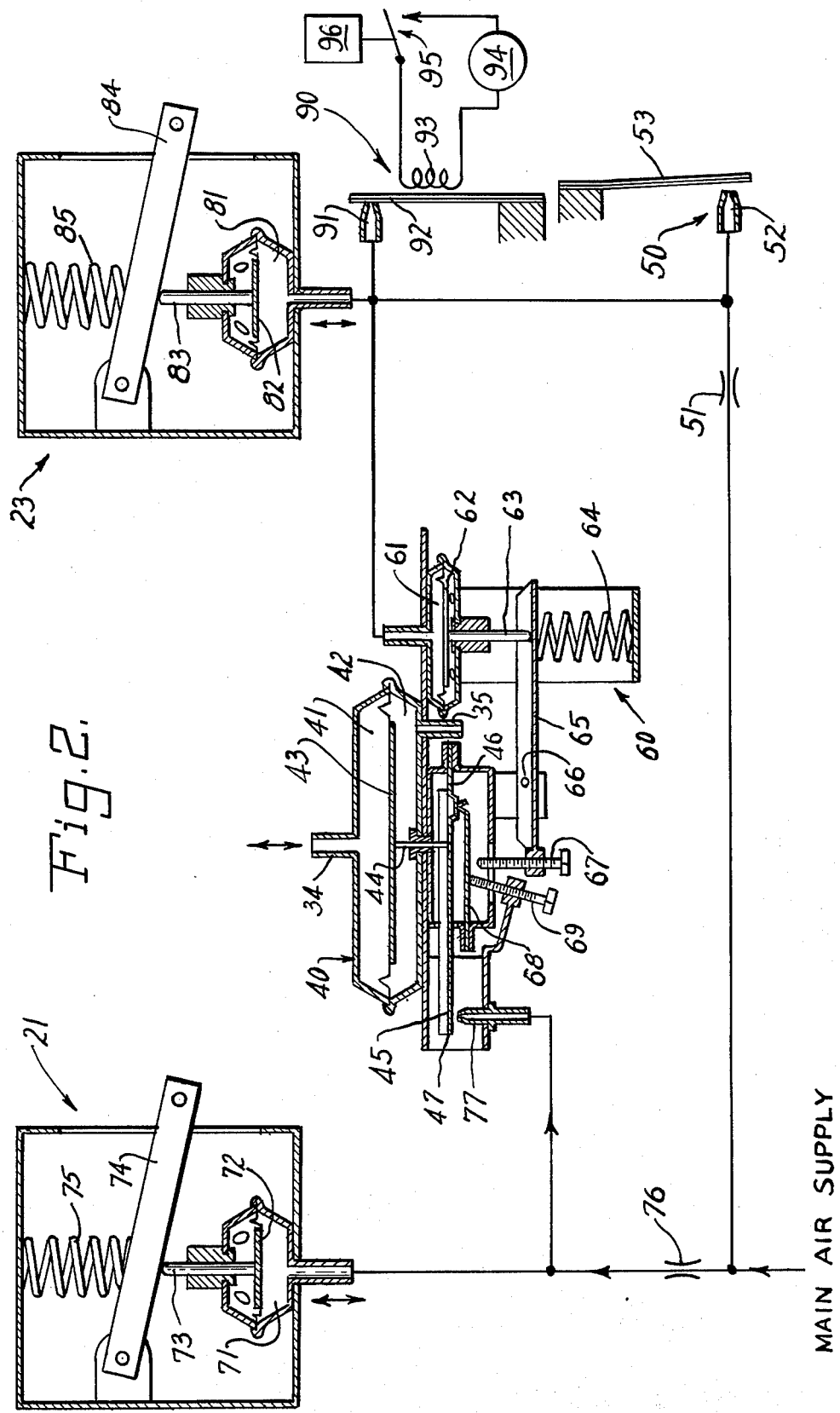

DAMPER CONTROL FOR PREVENTING SPREAD OF FIRE AND SMOKE THROUGH AN INDUCTION MIXING BOX

BACKGROUND OF THE INVENTION

This invention relates to devices of the type that control the flow of conditioned primary air through a duct into a controlled space in response to a sensed condition, such as temperature, humidity, and the like. The flow of primary air through the box induces a flow of unconditioned air (usually return air) from a plenum into the box, where it becomes mixed with the conditioned primary air before entering the controlled space. The flow of secondary air from the plenum into the mixing box is normally controlled by a secondary air damper, so as to maintain a substantially constant flow of mixed air into the controlled space.

One of the problems encountered in central air conditioning systems incorporating such mixing boxes is the possible rapid spread of fire and smoke through the plenum and into the controlled space as a result of the induced secondary air flow. Separate fire dampers have been employed to prevent flow of secondary air into the mixing box when excessive temperature is detected. Such dampers ordinarily comprise a damper blade biased toward closed position and held open by a fusible link, which melts when heated to its melting point, thus permitting the damper blade to close. After the fusible link has melted, it must be replaced before the damper can be reset to open position. The resumption of normal air distribution is thus dependent upon the availability and installation of a new link. The necessity for carrying a stock of fusible links is undesirable. The time required of someone to replace the link could more profitably be spent on other matters. Testing of the operation of the fire damper is impossible, since the fusible link is destroyed by application of sufficient heat to operate the fire damper. Another fire damper is held in open position by a latch responsive to a thermostatic bimetal. Upon detection of an excessive temperature, the latch is withdrawn, releasing the normally-closed damper and thereby permitting it to close. This type necessitates the resetting of the latch after each operation. The installation of such separate fire dampers also increases the installation cost.

SUMMARY OF THE INVENTION

According to the present invention a fire detector has been incorporated into a control for an induction mixing box such that when an excessive temperature is detected in a plenum, from which a flow of secondary air is induced, the secondary air damper is closed, thus preventing spread of any fire through the induction box. The control is pneumatically operated with a secondary air damper biased toward closed position and variably positioned by a pneumatic actuator in response to a variably controlled branch air pressure. The actuator is also in communication with a normally closed valve. A thermostatic sensing element, such as a bimetal, a bellows, or the like, exposed to the air temperature in the plenum opens the valve upon detection of an excessive temperature in the plenum, thus permitting air to escape from the actuator and thereby permitting the secondary air damper to be closed by its bias. The valve is automatically closed when the plenum air temperature is reduced to normal, permitting the damper blade to be opened by the actuator so that normal operation can be resumed.

The operation of the damper in response to excessive temperature in the plenum may be checked by applying auxiliary heat, as by an electric heater, to the thermostatic element.

The application of auxiliary heat may be made subject to detection of smoke, so that spread of smoke may also be prevented.

BRIEF DESCRIPTION OF THE DRAWINGS

FIG. 2 is a schematic diagram, partially in section, representative of a preferred embodiment of this invention.

DESCRIPTION OF THE PREFERRED EMBODIMENT

Figure 1:
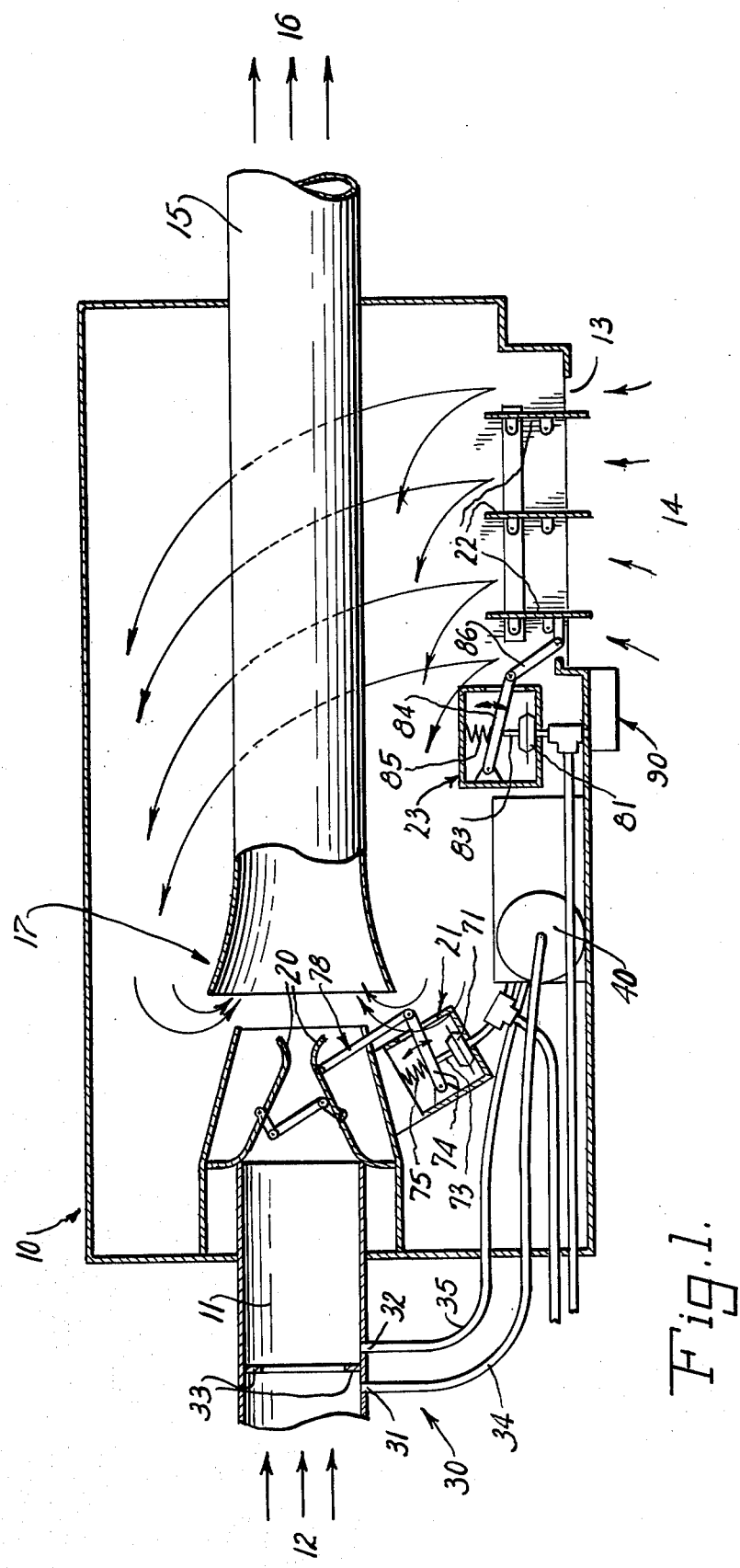
FIG. 1 is a section view of a mixing box employing this invention.

As shown in FIG. 1 an induction mixing box 10 has an inlet 11 for entrance into the box of conditioned primary air 12 delivered, at above atmospheric pressure, from a primary source (not shown), an inlet 13 for entrance of secondary (usually return) air 14 into the box, an outlet 15 for exhaust of mixed primary and secondary air 16 from the box for delivery to a condition controlled space (not shown), and means 17 in the box for inducing flow of secondary air into the box in response to flow of primary air therethrough, the primary and secondary air being mixed as a result of the induction. A primary damper 20, positioned by an actuator 21, controls the volume rate of flow of primary air 12 through inlet 11. A second damper 22, positioned by an actuator 23, restricts the flow of secondary air 14 through inlet 13.

One control for an induction mixing box, as disclosed in the copending patent application Ser. No. 810,235, filed on June 27, 1977 by Frederick J. Meyers and Marvin H. Zille, is shown in FIGS. 1 and 2, in which a flow sensor 30 comprises pressure taps 31, 32 located upstream and downstream respectively from a restriction 33 in the path of primary air 12 flowing through inlet 11. Tubes 34, 35 are connected to transmit air pressure from the taps 31, 32 respectively.

A flow transducer 40, as shown in FIG. 2, comprises a high pressure chamber 41 and a low pressure chamber 42 with a flexible diaphragm 43 forming a common wall between the chambers. A rod 44 transmits motion of the diaphragm to the outside of the flow transducer. The upstream tap 31 communicates its pressure output to the high pressure chamber 41 through tube 34 and downstream tap 32 communicates its pressure output to the low pressure chamber 42 through tube 35, so that the flow transducer will be recognized as a differential pressure transducer and the motion of rod 44 will become a flow signal. The rod 44 engages a rigid flapper 45 pivoted at end 46 and having a free end 47.

Pressure regulated air from a main air supply passes into a condition transducer 50 through restrictor 51 to become a condition responsive branch air pressure controlled by bleed of air through a nozzle 52 as permitted by a condition sensor 53. The condition sensor is responsive to a condition being controlled in the condition controlled space. As shown in FIG. 2 it comprises a cantilevered laminated flapper, such as a thermostatic bimetal, movable toward and away from the nozzle 52 in response to the sensed condition. The condition responsive branch air pressure produced in condition transducer 50 thus becomes a condition signal. An operator 60 receives the condition signal as branch air pressure in a pressure chamber 61 having a flexible diaphragm 62 as one wall. The force produced on the diaphragm by the air pressure is transmitted by a guided pin 63 in opposition to the force exerted by a bias spring 64 to one end of a lever 65 rotatable about a pivot 66. At the other end of the lever is an adjustable contact 67, engagable with a cantilevered resilient bias beam 68 to apply a condition variable bias to flapper 45 in opposition to the flow signal. A minimum bias adjustment 69 provides a predetermined minimum bias to flapper 45 through beam 68. The minimum bias along with the flow signal determines the position of the end 47 of flapper 45 in absence of a condition signal. When the condition variable bias exceeds the minimum bias, the position of end 47 is reset as a function of the sensed condition.

The actuator 21 comprises a pressure chamber 71 having a flexible diaphragm 72 as one wall thereof. A guided rod 73 movable by the diaphragm 72 engages an actuating lever 74. A bias spring 75 opposes outward movement of the rod. Chamber 71 receives air from a pressure regulated main air supply through a restrictor 76 and variably exhausts air through a nozzle 77 in response to the position of the free end 47 of flapper 45. As the end 47 moves toward nozzle 77, the pressure in chamber 71 increases and the resulting force exerted on diaphragm 72 is transmitted through rod 73 and against the opposition of spring 75 to move actuating lever 74 upward. The lever 74 is operatively connected to damper 20 by means of a linkage 78, as seen in FIG. 1, so that upward movement of lever 74 moves damper 20 toward closed position. As the pressure in chamber 71 decreases, the spring 75 moves actuating lever 74 downward to further open the damper 20.

Actuator 23 comprises a pressure chamber 81 having a flexible diaphragm 82 as one wall thereof. A guided rod 83 movable by the diaphragm 82 engages an actuating lever 84. A bias spring 85 opposes outward movement of the rod. Chamber 81 receives the condition signal as branch air pressure from the condition transducer 50. As the pressure in chamber 81 increases, the resulting force exerted on diaphragm 72 is transmitted through rod 83 against the opposition of spring 85 to move actuating lever 84 upward. The lever 84 is operatively connected to damper 22 by means of a linkage 86, as seen in FIG. 1, so that upward movement of lever 84 moves damper 22 toward closed position. As the pressure in chamber 81 decreases, the spring 85 moves actuating lever 84 downward to further open the damper 22.

Let us assume that the condition controlled space requires cooling in order to maintain a substantially constant temperature therein. The primary air would be cooled to a substantially constant cool temperature, such as 40° F. Upon start-up the flapper 45 will be positioned by bias beam 68 such that end 47 is spaced from nozzle 77, permitting branch air to bleed therefrom and so lower the pressure in chamber 71, permitting spring 75 to move actuating lever 74 downwardly to assure that damper 20 is open, thus allowing the pressurized cool primary air 12 to enter the mixing box 10 through inlet 11 and to exit through outlet 15 for delivery to the temperature controlled space. If the condition sensor 53 senses a relatively high temperature in the space, the nozzle 52 will be substantially closed, providing a relatively high condition signal in the form of a high branch air pressure to actuator 23 and operator 60. The high pressure in chamber 81 will move actuating lever 84 upward to close damper 22 and so prevent entrance of secondary air 14, which we will assume to be return air at the sensed temperature, into the box. As a result maximum cooling is provided, thereby cooling the temperature controlled space rapidly without regard for the comfort of persons in the path of the delivered cool air. The high pressure in chamber 61 will move lever 65 so that the adjustable contact 67 engages the bias beam 68 causing it to move the free end 47 of flapper 45 away from nozzle 77, thus lowering the branch pressure in chamber 71 so that actuating lever 74 is moved downwardly by spring 75, thereby opening wide the damper 20 and permitting a high flow of cool primary air 12 through box 10 for delivery to the temperature controlled space.

The flow of primary air 12 through the restriction 33 will produce a lower pressure on the downstream side thereof. The higher pressure upstream from the restriction at tap 31 is communicated through tube 34 to high pressure chamber 41 in flow transducer 40, while the lower pressure downstream at tap 32 is communicated through tube 35 to the low pressure chamber 42. If the volume rate of flow of primary air through the restriction 33 increases, as due to an increase in pressure at the primary source or a decrease in primary air required to condition other spaces supplied from the same source, the difference between the upstream and downstream pressures will increase, causing the diaphragm 43 to exert a greater downward force through rod 44 against flapper 45 in opposition to the bias force provided by beam 68. As a result, free end 47 will approach nozzle 77, restricting the bleed therethrough, thus increasing the branch air pressure in the pressure chamber 71 and causing actuating lever 74 to move upwardly to partially close the damper 20 and so reduce the volume rate of flow of primary air through the box. If the flow of primary air is reduced, the difference between the upstream and downstream pressures will be reduced and the damper 20 will be opened further. As a consequence of the opening and closing action of the damper in response to the flow responsive pressure differences received by the flow transducer 40, the volume rate of flow of primary air 12 into the box is maintained substantially constant.

As the sensed temperature in the controlled space falls, the flapper 53 will move away from nozzle 52, allowing more air to bleed therethrough and so lowering the branch air pressure delivered as the condition signal by condition transducer 50 to pressure chambers 61, 81. The lower pressure in chamber 61 will permit spring 64 to rock lever 65 to move the adjustable contact 67 downward and so reduce the bias force applied by bias beam 68 on flapper 45. The flapper 45 will then move downwardly causing its free end 47 to approach nozzle 77, restricting further the bleed of air therethrough and so increasing the branch air pressure in chamber 71. The increased pressure will exert an increased upward force on actuating lever 74, causing a partial closing of damper 20 and a reduction in the volume rate of flow of primary air into the box. This reduction is not as a result of an increase in the sensed volume rate of flow, but of a resetting of the value at which the volume rate of flow is to be maintained in response to a reduced demand for cooling. The lower pressure in chamber 81 will permit spring 85 to move actuating lever 84 downward, resulting in partial opening of the damper 22 to permit entry of secondary air 14, which we assume to be return air at the sensed temperature of the condition controlled space. The flow of primary air 12 through the flow inducing means 17 in box 10 aspirates secondary air 14 into the stream of air, resulting in mixed air 16 exiting from outlet 15 for delivery to the condition controlled space. The position of the damper 22 is controlled as a function of the sensed condition in the condition controlled space in a manner to maintain the volume rate of flow of mixed air substantially constant. In other words, as the volume rate of flow of primary air is decreased in response to a decrease in the condition signal, the volume rate of flow of secondary air is increased by a substantially equal amount. A change in the condition signal therefore has an opposite affect upon the volume rates of flow of primary and secondary air. As the sensed condition increases toward a desired set point, the proportion of secondary air is increased with respect to primary air until, at the set point condition, the amount of cooling provided by the primary air delivered into the space just equals the heat losses therefrom. Further changes in the sensed condition result in modulation of the proportions of primary and secondary air delivered as mixed air into the conditioned space as required to maintain the sensed condition substantially constant at the set point. Although the temperature of the mixed air changes with the proportions of primary and secondary air mixed therein, the volume rate of flow of mixed air remains substantially constant so that the air distribution pattern in the space is unchanged.

The present invention concerns apparatus for controlling operation of the actuator 23 to close the damper 22 to prevent secondary air from entering the mixing box 10 when a temperature indicating the possibility of fire is detected in the secondary air. In this manner the spread of fire and smoke is inhibited, thus reducing fire and smoke damage.

The fire sensitive control of the present invention comprises a normally closed thermostatically controlled exhaust valve 90, shown as a bleed nozzle 91 and a bimetallic flapper 92, in communication with pressure chamber 81 in actuator 23. The valve 90, or at least the thermostatic element 92 controlling operation of the valve, is located in the secondary air upstream from the damper 22. As shown in FIG. 1, the valve 90 is located for convenience on the mixing box 10 adjacent inlet 13. Such a location permits the valve to be assembled on the mixing box and to be sold and delivered as part of a complete control unit, thus avoiding the time and cost required for separate mounting and connection of the valve during installation. Being close to the secondary air inlet 13, assures that the thermostatic element 92 accurately senses the temperature of secondary air entering the box. In the position shown some of the secondary air entering the mixing box passes over the thermostatic element. A location totally in the secondary air stream entering the box would provide more accurate temperature sensing, but would be less convenient. The valve must have an exhaust port (nozzle 91) sized, when open, to permit escape of branch air therethrough in sufficient volume to remove all effective branch air pressure from the actuator 23. The thermostatic element, of whatever type, is selected and mounted to maintain the exhaust valve closed until the sensed secondary air temperature becomes excessive, at and above the normally expected maximum temperature of the secondary air. On a top floor, with the plenum between the ceiling and the roof, the maximum expected temperature of the secondary air in the plenum may, under some circumstances, reach 140°-160° F. (60°-71° C.). On lower floors, when the secondary air is return air, the maximum secondary air temperature is approximately the same as the sensed temperature of the controlled space, or spaces. Many conventional separate fire dampers close at 165° F. (74° C.). Because materials normally found in air conditioned spaces ignite at much higher temperatures, it is not necessary that the valve open completely upon initial detection of excessive secondary air temperature, but rapid or snap action opening is desirable. If the temperature rises rapidly to excessive values, spread of fire is imminent and the thermostatic element will, if properly selected, respond rapidly to fully open the exhaust valve. If the temperature rises slowly, there is less urgency for fully opening the exhaust valve, since the spread of fire into the controlled space is not imminent. As long as the valve remains closed, the fire sensitive control remains inoperative. Upon detection of an excessive secondary air temperature, the thermostatic element 92 opens the exhaust valve (bleed nozzle 91), permitting branch air to be exhausted from the chamber 81 in actuator 23 in sufficient quantity to remove the effective branch air pressure therefrom. (The effective pressure is any pressure above that required to initiate opening or prevent complete closure of the damper 22.) This permits the spring 85 to move lever 84, downward as shown, to close damper 22, preventing entry of secondary air into the mixing box 10, and thereby preventing the excessively hot secondary air from being discharged into the controlled space. When the excessive temperature is no longer sensed by the thermostatic element 92, the valve 91 is automatically closed. This permits the condition responsive branch air pressure to be solely controlled by the condition sensor 53 once again, thus returning the mixing box to normal operation. No replacement or resetting of components is required.

The fire sensitive control may be tested for operability by the addition of an auxiliary source of heat such as an electric resistance heater 93 placed in such proximity to the thermostatic element 92 that, when the heater is energized, the thermostatic element will sense the excessive temperature required to open the exhaust valve 91. Energization of the heater 93 is shown as accomplished from a source of electric current 94 by closure of a normally open switch 95.

By making operation of the switch 95 responsive to detection of smoke by a smoke detector 96, the damper 22 may be closed when smoke is detected in the secondary air, thereby preventing the spread of smoke into the controlled space. When smoke is no longer detected, the switch is automatically opened by the smoke detector, allowing the mixing box to resume its normal operation.

The disclosed embodiment is merely representative of the invention. Many equivalents and modifications will be obvious to those skilled in the art. The scope of the patent is defined by the claims.

We claim:

1. A damper control for preventing spread of fire into a controlled space through an induction mixing box wherein a flow of primary air through said box induces a flow of secondary air into and through the box, said flow of secondary air into the box being controlled by a normally closed secondary air damper variably opened by a pneumatic actuator in response to the variable effective pressure of branch air therein, a temperature sensor in said controlled space, and means for admitting the branch air under pressure into said actuator as a function of the sensed temperature in said controlled space, the damper control comprising a normally closed exhaust valve in communication with said actuator, a port in said valve sized to permit escape of the branch air therethrough in sufficient volume to remove all effective pressure of the branch air from said actuator, and a thermostatic element positioned to sense the temperature of said secondary air upstream from said damper and to open said valve upon sensing a predetermined excessive temperature, thereby removing the effective pressure of the branch air from the actuator, and thus permitting the secondary air damper to close and preventing flow of secondary air into said box.

2. A damper control according to claim 1 wherein said thermostatic element is located in the stream of secondary air entering the box.

3. A damper control according to claim 1 wherein said excessive temperature is above the expected normal maximum temperature of the secondary air.

4. A damper control according to claim 1 wherein said excessive temperature is substantially 74° C.

5. A damper control according to claim 1 wherein said thermostatic element opens the valve at said excessive temperature with a snap action.

6. A damper control according to claim 1 further comprising an auxiliary heat source in close proximity to said thermostatic element, such that heat selectively supplied by said auxiliary heat source raises the temperature sensed by said thermostatic element above said excessive temperature.

7. A damper control according to claim 6 wherein said auxiliary heat source comprises an electrical resistance heating element.

8. A damper control according to claim 7 further comprising switching means in series with said heating element for selectively energizing said heating element from a source of electric current.

9. A damper control according to claim 8 further comprising a smoke detector controlling closure of said switching means in response to detection of smoke in said secondary air, whereby spread of smoke through said mixing box into the controlled space is prevented.

* * * * *